United States Patent
Kwon

(10) Patent No.: US 7,231,938 B2
(45) Date of Patent: Jun. 19, 2007

(54) CHECK VALVE FOR PUMP OF ELECTRONICALLY CONTROLLED BRAKE SYSTEM

(75) Inventor: O-Kyun Kwon, Kyunggi-do (KR)

(73) Assignee: Hyundai Mobis Co., Ltd., Kyunggi-do (KR)

( * ) Notice: Subject to any disclaimer, the term of this patent is extended or adjusted under 35 U.S.C. 154(b) by 174 days.

(21) Appl. No.: 11/030,988

(22) Filed: Jan. 10, 2005

(65) Prior Publication Data

US 2006/0112995 A1 Jun. 1, 2006

(30) Foreign Application Priority Data

Dec. 1, 2004 (KR) .................. 10-2004-0099639

(51) Int. Cl.
*F16K 15/02* (2006.01)
(52) U.S. Cl. .................. 137/543.23; 137/508; 137/540; 137/843
(58) Field of Classification Search ............... 137/508, 137/540, 543.23, 843, 847, 860; 303/116.4
See application file for complete search history.

(56) References Cited

U.S. PATENT DOCUMENTS

| | | | | |
|---|---|---|---|---|
| 2,842,159 | A * | 7/1958 | Sprague | 137/513.7 |
| 5,810,455 | A * | 9/1998 | Noguchi | 303/9.62 |
| 6,644,621 | B2 | 11/2003 | Ji et al. | |
| 6,786,232 | B2 * | 9/2004 | Schuller et al. | 137/543.17 |
| 6,840,499 | B2 | 1/2005 | Ahn | |

* cited by examiner

*Primary Examiner*—Ramesh Krishnamurthy
(74) *Attorney, Agent, or Firm*—GreenBlum & Bernstein, P.L.C.

(57) ABSTRACT

A check valve for a pump of an electronically controlled brake system includes a valve body provided with a fluid path, a spring seat placed in an outlet of the fluid path of the valve body, a valve rod fitted at a lower end thereof into an inlet of the fluid path of the valve body, a valve piston provided with a through hole that is selectively opened and closed by an upper end of the valve rod, as the valve piston moves upward and downward along an inner wall of the valve body, and a spring interposed between the spring seat and the valve piston.

15 Claims, 2 Drawing Sheets

FIG. 1            PRIOR ART
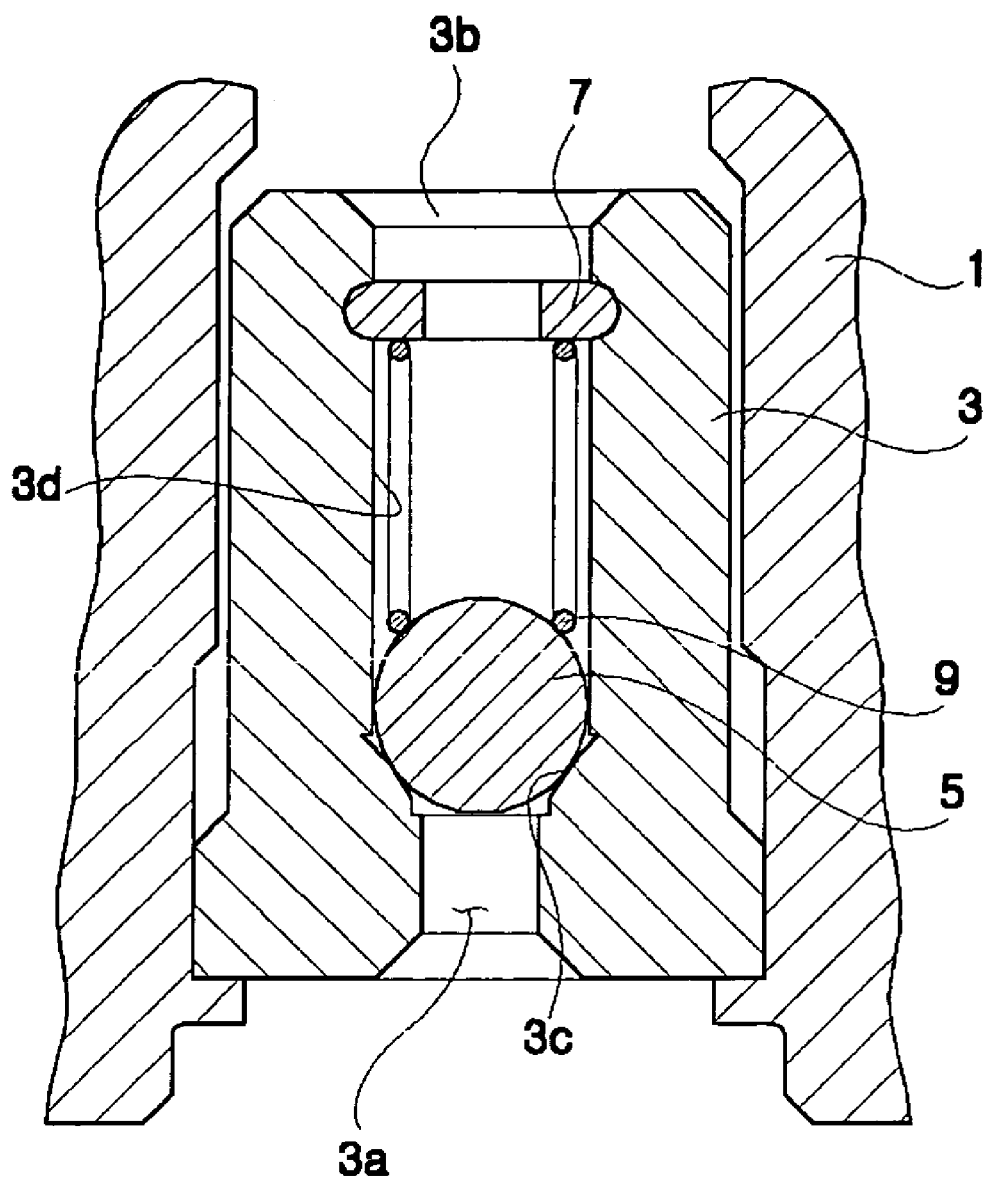

US 7,231,938 B2

CHECK VALVE FOR PUMP OF ELECTRONICALLY CONTROLLED BRAKE SYSTEM

RELATED APPLICATIONS

The present disclosure relates to subject matter contained in priority Korean Application No. 10-2004-0099639, filed on Dec. 1, 2004, which is herein expressly incorporated by reference in its entirety.

BACKGROUND OF THE INVENTION

1. Field of the Invention

The present invention relates generally to a check valve for the pump of an electronically controlled brake system, such as an anti-lock brake system, a brake traction control system or a vehicle dynamic control system, and, more particularly, to a piston type check valve.

2. Description of the Related Art

In general, an electronically controlled brake system is used to provide powerful and stable braking force by preventing an automobile from skidding. For such electronically controlled brake systems, there have been disclosed an Anti-lock Brake System (ABS) for preventing an automobile from skidding during the application of a brake, a Brake Traction Control System (BTCS) for preventing driving wheels from skidding during the abrupt start or acceleration of an automobile, and a Vehicle Dynamic Control System (VDCS) for maintaining an automobile in a stable state by controlling brake oil pressure using a combination of an ABS and a BTCS.

Such an electronically controlled brake system includes a plurality of solenoid valves for controlling brake oil pressure transmitted to hydraulic brakes mounted on the wheels of an automobile, a low-pressure accumulator and high-pressure accumulator for temporarily storing brake oil removed from the hydraulic brakes, a motor and pump for forcibly pumping brake oil stored in the low-pressure accumulator, and an Electronic Control Unit (ECU) for controlling the operation of the solenoid valves and the motor. The above-described components are enclosed in a compact pump housing made of aluminum.

A conventional check valve for controlling the flow of fluid in a pump for an electronically controlled brake system is depicted in FIG. 1.

FIG. 1 is a sectional view showing a conventional ball-type check valve that is used in the pump of the electronically controlled brake system. The ball-type check valve, as shown in FIG. 1, includes a valve body 3 provided with an inlet 3a, an outlet 3b and a valve seat 3c, a ball 5 adapted to selectively opening and closing the valve seat 3c, a spring seat 7 tightly fitted into the valve body 3, and a spring interposed between the ball 5 and the spring seat 7. The check valve constructed as described above is tightly fitted into a pump housing 1.

Meanwhile, the above-described check valve has the following problems.

First, when the ball 5 moves away from the contact surface of the valve body 3, the ball 5 moves laterally due to the gap between the inner wall 3d of the valve body 3 and the ball 5, so that the operation thereof is unstable, thus causing the discharge pressure value of the outlet 3b to be unstable.

Second, when the ball 5 moves away from the contact surface and then comes into contact with the contact surface, the contact position of the ball 5 may vary due to the movement of the ball 5, so that leakage and variation in opening pressure may occur due to the irregular wear and variation in contact position of the ball 5 during long-term operation.

Third, since the spring 9 is seated on the spherical ball 5, the seating surface of the spring 9 is not stable, so that the function of the spring 9 may be degraded due to the offset of the spring 9, or the function and quality of the check valve may be considerably reduced due to the contact of the spring 9 with the inner wall 3d of the valve body 3.

SUMMARY OF THE INVENTION

Accordingly, the present invention has been made keeping in mind the above problems occurring in the prior art, and an object of the present invention is to provide a check valve for the pump of an electronically controlled brake system that has a structure capable of solving the problems of the conventional check valve by providing stable upward and downward movement without lateral movement.

In order to accomplish the above object, the present invention provides a check valve for the pump of an electronically controlled brake system, including a valve body provided with a fluid path; a spring seat placed in the outlet of the fluid path of the valve body; a valve rod fitted at the lower end thereof into the inlet of the fluid path of the valve body; a valve piston provided with a through hole that is selectively opened and closed by an upper end of the valve rod, as the valve piston moves upward and downward along the inner wall of the valve body; and a spring interposed between the spring seat and the valve piston.

With the above-described construction, the outer diameter of the valve piston comes into tight contact with the inner wall of the valve body and moves upward and downward without lateral movement, thus stabilizing discharge pressure value and preventing leakage and variation in opening pressure.

When the valve piston is fabricated by a plastic injection molding process, the fabrication of the valve piston is easy and the valve piston can smoothly move upward and downward without excessive frictional resistance.

Meanwhile, a fluid guide element for guiding influx fluid to the through hole is further formed, flow rate loss can be reduced and the outer diameter of the fluid guide element functions to come into tight contact with the valve body.

Furthermore, when a lip seal is formed on the fluid guide element, friction due to excessive compression does not occur, volume variation based on temperature variation is absorbed, and desired durability is excellent.

Furthermore, when a spring positioning portion is further formed on the valve piston, the performance and quality of the check valve can be prevented from being degraded.

BRIEF DESCRIPTION OF THE DRAWINGS

The above and other objects, features and advantages of the present invention will be more clearly understood from the following detailed description taken in conjunction with the accompanying drawings, in which:

FIG. 1 is a sectional view showing a conventional ball-type check valve that is used in the pump of an electronically controlled brake system.

DESCRIPTION OF THE PREFERRED EMBODIMENTS

Figure 2A:
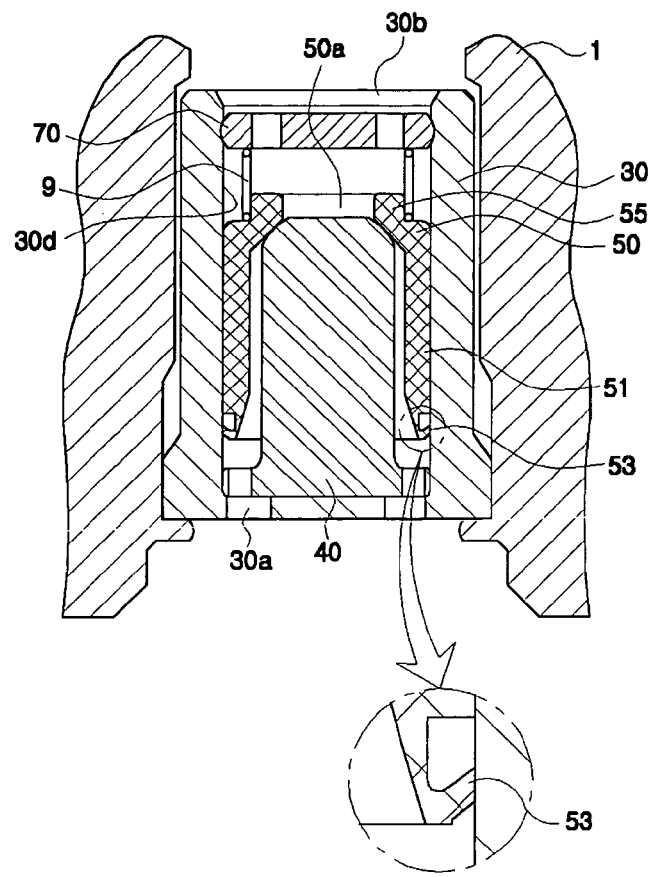
FIGS. 2a and 2b are sectional views showing the opening and closing positions of a piston type check valve, respectively, that is used in the pump of an electronically controlled brake system, in accordance with a preferred embodiment of the present invention.

Reference now should be made to the drawings, in which the same reference numerals are used throughout the different drawings to designate the same or similar components.

Figure 2B:
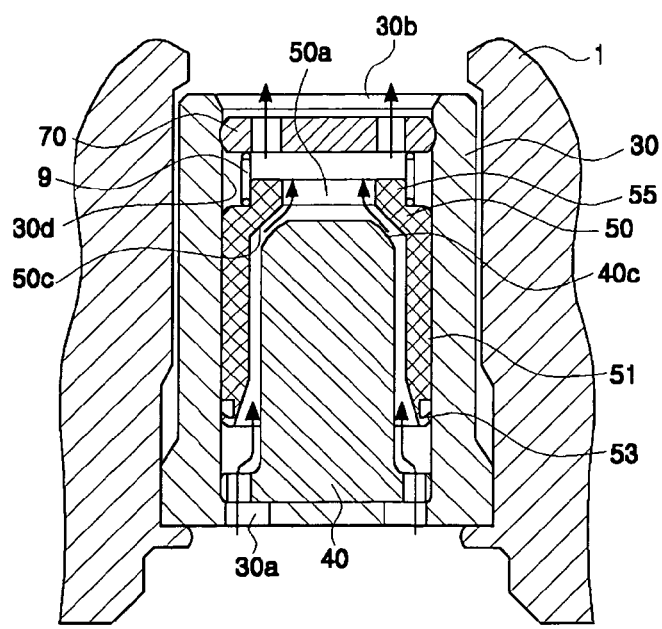

FIGS. 2a and 2b are sectional views showing the opening and closing positions of a piston type check valve, respectively, that is used in the pump of an electronically controlled brake system, in accordance with a preferred embodiment of the present invention.

The check valve according to the present invention, as shown in FIGS. 2a and 2b, includes a valve body 30 provided with a fluid path, a spring seat 70 placed in the outlet 30b of the flow path of the valve body 30, a valve rod 40 tightly fitted at the lower end thereof into the flow path inlet 30a of the valve body 30, a valve piston 50 selectively opened and closed by the valve rod 40 while moving upward and downward along the inner wall 30d of the valve body 30, and a spring 9 interposed between the spring seat 70 and the valve piston 50. The check valve constructed as described above is tightly fitted into a pump housing 1.

A movable valve seat 50c having a through hole 50a in the center portion thereof is formed in the valve piston 50. When the valve seat 50c is positioned at the upper end 40c of the fixed valve rod 40, the through hole 50a is closed; whereas when a gap is formed between the valve seat 50c and the upper end 40c, the through hole 50a is opened, thus causing the flow of fluid.

Using the opening and closing method, the check valve can be designed so that the outer surface of the valve piston 50 comes into tight contact with the inner wall 30d of the body 30. With the above-described construction, when the valve piston 50 moves upward and downward, the lateral movement of the valve piston 50 can be prevented, so that the discharge pressure value of the outlet can be significantly stabilized. Furthermore, the contact surface of the valve piston 50 and the valve rod 40 is kept constant and the contact position of the valve piston 50 does not vary, so that leakage and variation in opening pressure can be prevented.

The valve piston 50, which comes into tight contact with the inner wall 30d of the valve body 30, is preferably fabricated by a plastic injection molding process to be easily manufactured and to move upward and downward smoothly by means of lubrication function.

Meanwhile, a fluid guide element 51 for guiding influx fluid to the through hole 50a is preferably formed in the valve piston 50 so that the response speed of the valve piston 50 can be improved due to an increase in fluid flow efficiency and the lateral movement of the valve piston 50 can be prevented due to the tight contact with the inner wall 30d of the valve body 30. The fluid guide element 51 is preferably fabricated by a plastic injection molding process.

Moreover, a spring positioning portion 55 for determining the position of the spring 9 is preferably formed on the valve piston 50. That is, the spring positioning portion 55 is a projection formed around the through hole 50a, which can securely maintain the initial position of the spring 9. As a result, deterioration in the performance and quality of the check valve can be prevented.

A lip seal 53 is preferably formed on the fluid guide element 51. When the lip seal 53 is formed at the lower end of the fluid guide element 51, friction is prevented by compression, volume variation due to temperature variation is absorbed, a sealing effect can be achieved by the deformation of the lip portion of the lip seal 53 caused by fluid pressure, and durability is excellent.

In accordance with the above-described piston type check valve for the pump of the electronically controlled brake system, the following effects can be achieved.

First, the selective opening and closing are conducted by the valve piston that moves upward and downward while being in contact with the inner wall 30d of the valve body, so that, a) when the valve piston moves upward and downward, lateral movement can be prevented, so that the discharge pressure value of the outlet is stabilized, and b) the position of the contact surface of the valve piston and the valve rod is kept constant and the contact position of the valve piston does not vary, so that leakage and variation in opening pressure can be prevented.

Second, the valve piston is fabricated by a plastic injection molding process, so that the manufacture thereof is easy and the friction coefficient is low, thus considerably reducing the friction between the valve piston and the inner wall and, therefore, allowing smooth upward and downward movement.

Third, the fluid guide element is formed on the valve piston to guide fluid to the through hole, so that a) the opening and closing response speed of the valve piston can be improved, and b) the tight contact of the valve piston with the inner wall of the valve body is further secured.

Fourth, the lip seal is further formed on the fluid guide element, so that friction due to excessive compression can be prevented, volume variation based on temperature variation is absorbed, a sealing effect is produced due to the deformation of lip portion of the lip seal caused by fluid pressure, and durability is excellent.

Fifth, the spring positioning portion is formed on the valve piston to determine the position of the spring, so that the position of the spring does not deviate from the spring positioning portion during the mounting of the spring seat or the operation of the check valve, thus preventing degradation in the performance and quality of the check valve due to the variation in the position of the spring.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A check valve for a pump of an electronically controlled brake system, comprising:
    a valve body provided with a fluid path;
    a spring seat placed in an outlet of the fluid path of the valve body;
    a valve rod fitted at a lower end thereof into an inlet of the fluid path of the valve body;
    a valve piston provided with a through hole that is selectively opened and closed by engagement between a surface provided on the valve piston and an upper end of the valve rod, as the valve piston moves upward and downward along an inner wall of the valve body; and
    a spring interposed between the spring seat and the valve piston,
    wherein at least a portion of the valve piston surrounds a longitudinally extending surface of the valve rod, when the valve piston moves upward and downward along an inner wall of the valve body.

2. The check valve as set forth in claim 1, wherein the valve piston is fabricated by a plastic injection molding process.

3. The check valve as set forth in claim 1, wherein the valve piston is further provided with a fluid guide element to guide influx fluid to the through hole.

4. The check valve as set forth in claim 2, wherein the valve piston is further provided with a fluid guide element to guide influx fluid to the through hole.

5. The check valve as set forth in claim 3, wherein the fluid guide element is further provided with a lip seal.

6. The check valve as set forth in claim 4, wherein the fluid guide element is further provided with a lip seal.

7. The check valve as set forth in claim 5, wherein the valve piston is further provided with a spring positioning portion that determines a position of the spring.

8. The check valve as set forth in claim 6, wherein the valve piston is further provided with a spring positioning portion to determine a position of the spring.

9. A check valve for a pump of an electronically controlled brake system, comprising:

a valve body provided with a fluid path;

a spring seat placed in an outlet of the fluid path of the valve body;

a valve rod fitted at a lower end thereof into an inlet of the fluid path of the valve body;

a valve piston provided with a through hole that is selectively opened and closed by engagement between a surface provided on the valve piston and an upper end of the valve rod, as the valve piston moves upward and downward along an inner wall of the valve body; and a spring interposed between the spring seat and the valve piston, wherein the valve piston is fabricated by a plastic injection molding process.

10. The check valve as set forth in claim 9, wherein the valve piston is further provided with a fluid guide element for guiding influx fluid to the through hole.

11. The check valve as set forth in claim 9, wherein the valve piston is further provided with a fluid guide element for guiding influx fluid to the through hole.

12. The check valve as set forth in claim 9, wherein the fluid guide element is further provided with a lip seal.

13. The check valve as set forth in claim 12, wherein the fluid guide element is further provided with a lip seal.

14. The check valve as set forth in claim 13, wherein the valve piston is further provided with a spring positioning portion for determining a position of the spring.

15. The check valve as set forth in claim 14, wherein the valve piston is further provided with a spring positioning portion for determining a position of the spring.

* * * * *